(12) United States Patent
Ban et al.

(10) Patent No.: US 7,190,402 B2
(45) Date of Patent: Mar. 13, 2007

(54) VISUAL SENSOR FOR CAPTURING IMAGES WITH DIFFERENT EXPOSURE PERIODS

(75) Inventors: Kazunori Ban, Yamanashi (JP); Makoto Yamada, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 962 days.

(21) Appl. No.: 10/140,998

(22) Filed: May 9, 2002

(65) Prior Publication Data

US 2002/0167604 A1 Nov. 14, 2002

(30) Foreign Application Priority Data

May 9, 2001 (JP) .............................. 2001-139112

(51) Int. Cl.
*H04N 5/235* (2006.01)
(52) U.S. Cl. .................... 348/362; 348/229.1; 356/606
(58) Field of Classification Search ........... 348/208.12, 348/221.1, 229.1, 298, 362, 364, 366, 367; 356/602, 606, 607, 608
See application file for complete search history.

(56) References Cited

U.S. PATENT DOCUMENTS

| | | | | |
|---|---|---|---|---|
| 5,076,697 | A | * 12/1991 | Takagi et al. ................ | 356/603 |
| 5,335,075 | A | * 8/1994 | Komiya et al. .............. | 348/298 |
| 6,268,918 | B1 | * 7/2001 | Tanabe et al. ............... | 356/602 |
| 6,421,086 | B1 | 7/2002 | Kuno et al. | |
| 6,614,537 | B1 | * 9/2003 | Yahashi ....................... | 356/602 |

FOREIGN PATENT DOCUMENTS

| JP | 05-314253 | 11/1993 |
|---|---|---|
| JP | 08-279900 | 10/1996 |
| JP | 09-311927 | 12/1997 |
| JP | 10-021378 | 1/1998 |
| JP | 11-18002 | 1/1999 |
| JP | 11-066279 | 3/1999 |
| JP | 11-134505 | 5/1999 |
| JP | 11-167635 | 6/1999 |
| JP | 11-187199 | 7/1999 |

(Continued)

OTHER PUBLICATIONS

Office Action.

(Continued)

*Primary Examiner*—Ngoc-Yen Vu
*Assistant Examiner*—Gary C. Vieaux
(74) *Attorney, Agent, or Firm*—Staas & Halsey LLP

(57) ABSTRACT

A visual sensor capable of expanding a dynamic range with a little load of processing for arithmetic operations and performing a stable detection not affected by change of conditions such as ON/OFF state of projection of reference light. A multiplying parameter A (A>1) and the number N of times of image capturing are set in accordance with ON/OFF state of the reference light projection. N images are captured with a shutter speed varying by successively multiplying an initial value by (1/A). Values of density of each pixel in the captured images are summed. Values of constants B and C in equations: $1 = B \cdot Zmax + C$; $0 = B \cdot Zmin + C$ are obtained based on the maximum value $Zmax$ and the minimum value $Zmin$ of the summed values of densities of all the pixels. An output value $Z'$ of each pixel is obtained according to an equation: $Z' = B \cdot Z + C$, using the determined values of B and C.

24 Claims, 4 Drawing Sheets

FOREIGN PATENT DOCUMENTS

| | | |
|---|---|---|
| JP | 11-218415 | 8/1999 |
| JP | 11-355787 | 12/1999 |
| JP | 2000-2518 | 1/2000 |
| JP | 2000-50160 | 2/2000 |
| JP | 2000-217040 | 8/2000 |
| JP | 2000-358190 | 12/2000 |
| JP | 2001-28714 | 1/2001 |

OTHER PUBLICATIONS

EP Search Report for corresponding EP Application No. 02 25 3239 dated Oct. 26, 2004.

Notification of Grounds for Rejection (Office Action) in corresponding JP application No. 139112/2001 mailed Dec. 20, 2005.

* cited by examiner

VISUAL SENSOR FOR CAPTURING IMAGES WITH DIFFERENT EXPOSURE PERIODS

BACKGROUND OF THE INVENTION

1. Field of the Invention

The present invention relates to a visual sensor using light receiving elements and a reference light beam such as laser beam in combination.

2. Description of the Related Art

In capturing an image of an object having a broad range of brightness gradation, it is necessary to adjust density of the captured image in conformity with a dynamic range of the visual sensor including an image capturing device such as a camera. There have been proposed several methods of adjusting the density of the captured image within the dynamic range of the visual sensor.

There is known form Japanese Patent Publications Nos. 10-21378 and 11-66279, a technique utilizing a method of an uniform ratio transformation in which density of each pixel of one of a plurality of images of an object captured in different conditions is multiplied by a predetermined ratio to be approximately adjusted to density of a corresponding pixel in another image, and a pixel not saturated in one image is substituted for a corresponding pixel saturated in the other image, to expand a dynamic range of the visual sensor.

The method disclosed in these Publications requires the density transformation of each pixel for adjusting densities of all pixels in a plurality of images, and comparison and substitution processing of the densities for obtaining a composite image. In the density transformation, processing of multiplication and division based on a density ratio between the corresponding pixels in the plurality of images is required to burden a heavy load of arithmetic processing to a processor.

Another method is known in which brightness of an incident light on each pixel is subjected to a logarithm transformation to determine density of each pixel in a view of processing for obtaining an edge image by differences between densities of adjacent pixels. A dynamic range of brightness of the incident light is compressed in this transformation. According to the logarithm transformation of brightness, a definition of an edge image based on the densities determined by the logarithm transformation depends on a ratio between degrees of the brightness of incident lights according to an equation $\log(I1)-\log(I2)=\log(I1/I2)$, where $I1$ and $I2$ represent degrees of the brightness of incident lights on adjacent pixels. Thus, this method solves a problem of dependency of the definition of an edge image upon an intensity of lighting and a reflectance of an object, i.e., the definition of an edge image in a dark area in the captured image is low and the definition of an edge image in a bright area in the captured image is high to cause imbalance of image.

Japanese Patent Publication No. 5-314253 describes the logarithm transformation of brightness in which a linear proportional transformation is applied in an area having a low brightness instead of the logarithm transformation in order to improve efficiency of usage of an image memory in the logarithm transformation of brightness. In this method, processing for the logarithm transformation of brightness is necessary for each pixel, to produce a considerable amount of arithmetic operation load to a processor.

Japanese Patent Publication No. 9-311927 discloses a technique of reducing halation by extending a low brightness range (increasing density) and compressing a high brightness range (decreasing density) for respective pixels using a brightness transformation table. This method has an advantage in reducing arithmetic operation load but it is necessary to prepare brightness transformation tables for various applications and thus is not advantageous in general purpose. Further, it is difficult to find out theory in preparing the transformation table and thus is prepared based solely on experience.

In detecting position/posture of an object using a visual sensor, an intensity of light incident on the visual sensor varies in dependence upon a brightness of an object which changes in accordance with ambient such as intensity of lighting or sunshine and a deviation of placement of an object (relative position/posture between the object and the visual sensor). Therefore, there is a case of causing halation in an area necessary for detection or including useful information can not be obtained because of darkness of the image. It has been desired to expand a dynamic range of the visual sensor with respect to brightness of the object.

SUMMARY OF THE INVENTION

An object of the present invention is to realize the logarithm transformation of brightness capable of expanding a dynamic range of a visual sensor by expanding a low brightness region and compressing a high brightness region with a little load of processing for arithmetic operations on a processor.

Another object of the present invention is to perform a stable detection by the logarithm transformation of brightness in accordance with ON/OFF state of projection of a reference light beam such as laser beam in capturing images of an object using the reference light.

According to one aspect of the present invention, the visual sensor comprises: image capturing means for capturing two-dimensional images of an object with controllable exposure periods; reference light projecting means for projecting reference light; storing means for storing parameters for altering the exposure period for capturing two-dimensional images by the image capturing means; image processing means for processing images captured by the image capturing means; reference light control means for controlling ON/OFF of the light projection by the reference light projecting means; and exposure period control means for controlling the exposure period so that the image capturing means captures images with different exposure periods in accordance with ON/OFF state of the light projection using the parameters stored in the storing means.

According to another aspect of the present invention, the visual sensor comprises: the image capturing means; the reference light projecting means; the storing means; the image processing means; and the reference light control means; and exposure period control means for controlling the exposure period in capturing two-dimensional images by the image capturing means in accordance with a density of a part of the two-dimensional image corresponding a lightened part of the object when the light projection is ON, and controlling the exposure period in capturing two-dimensional images by the image capturing means in accordance with a density of a part or a whole area of the two-dimensional image when the light projection is OFF using the parameters stored in the storing means.

The image processing means may include image composing means for producing a composite image based on densities of each pixel in a plurality of two-dimensional images captured with different exposure periods by the image capturing means.

According to still another aspect of the present invention, the visual sensor comprises: image capturing means for capturing a two-dimensional image of an object with a controllable gain of brightness; the reference light projecting means; storing means for storing parameters for altering the gain of brightness in capturing two-dimensional images by the image capturing means; the image processing means; the reference light control means; and gain control means for controlling the gain of brightness so that the image capturing means captures images with different gains of brightness in accordance with ON/OFF state of the light projection using the parameters stored in the storing means.

According to still another aspect of the present invention, the visual sensor comprises: the image capturing means for capturing a two-dimensional image of an object with a controllable gain of brightness; the reference light projecting means; the storing means for storing parameters for altering the gain of brightness in capturing two-dimensional images by said image capturing means; the image processing means; the reference light control means; and gain control means for controlling the gain of brightness in capturing two-dimensional images by the image capturing means in accordance with density of a part of the two-dimensional image corresponding a lightened part of the object when the light projection is ON, and controlling the exposure period in capturing two-dimensional images by the image capturing means in accordance with density of a part or a whole area of the two-dimensional image when the light projection is OFF using the parameters stored in the storing means.

In these cases, the image processing means may include image composing means for producing a composite image based on densities of each pixel in a plurality of two-dimensional images captured with different gains of brightness by said image capturing means.

The image composing means obtains a characteristic value representing at least a part of a range of the density of the captured two-dimensional images, and normalize density of the composite image based on the range of density represented by the characteristic value. The characteristic value may be one of a maximum value, a minimum value, a mean value, a standard deviation, a dispersion, a median and a mode of brightness of at least a part of the two-dimensional images, or any combination of the maximum value, the minimum value, the mean value, the standard deviation, the dispersion, the median and the mode.

The reference light projecting means may project spot light or slit light. The image capturing means may comprise a camera having light receiving elements in the form of semiconductor.

The visual sensor may be connected to a robot and in this case the reference light control means controls ON/OFF of the light projection by the reference light projecting means in accordance with an operation of the robot or an operation program of the robot.

DETAILED DESCRIPTION OF THE PREFERRED EMBODIMENTS

Figure 1:
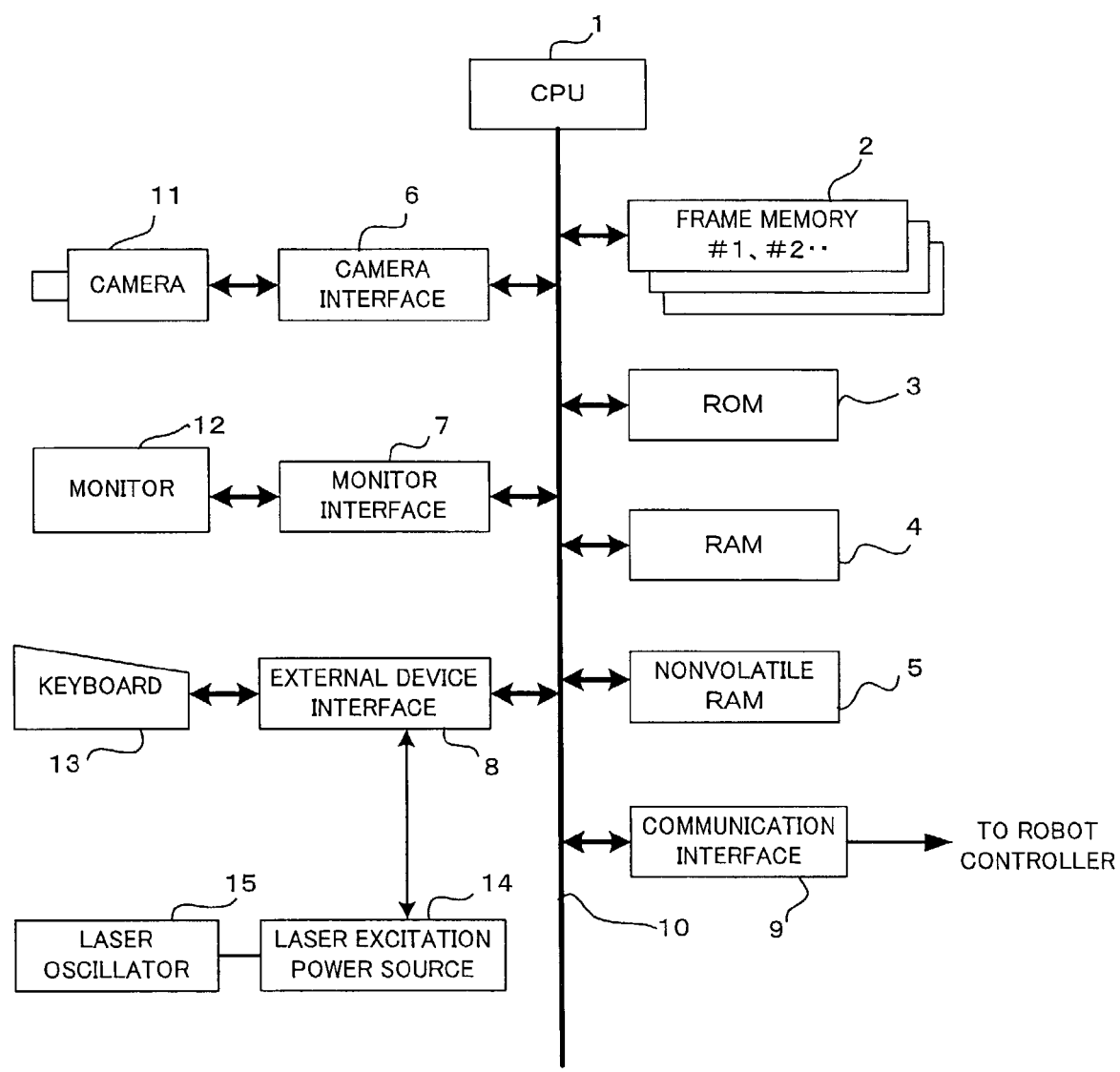
FIG. 1 is block diagram showing a basic configuration of a hardware of a visual sensor according to an embodiment of the present invention.
Figure 2:
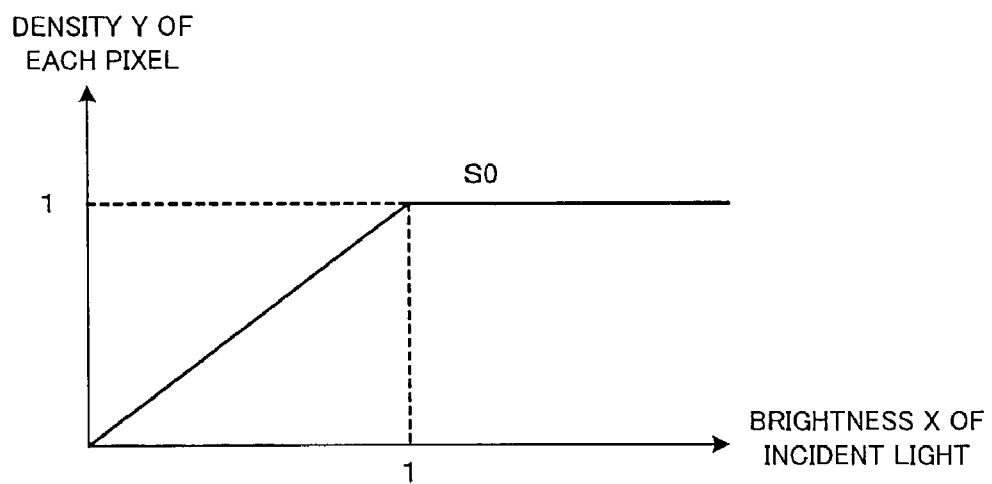
FIG. 2 is a graph showing a relationship between brightness of an incident light on a pixel and density of the pixel in a captured image.

FIG. 1 schematically shows a configuration of a visual sensor according to an embodiment of the present invention.

The visual sensor is generally controlled by a CPU 1 connected to a frame memories 2, a ROM 3, a RAM 4 and a nonvolatile RAM 5 through a bus 10. The ROM 3 stores programs for the visual sensor including a program for composite image processing particular in the present invention. The RAM 4 is used for temporary storage of data in the execution of the program. In the non-volatile RAM 5, set values for execution of the programs including parameters of magnification of an exposure period or a rate of change of a gain of brightness particularly in the present invention are stored.

A camera interface 6, a monitor interface 7, an external device interface 8 and a communication interface 9 are connected to the bus 10, and a camera 11 as two-dimensional image capturing device is connected to the camera interface 6. A monitor 12 such as a liquid crystal display (LCD) and a cathode lay tube (CRT) is connected with the monitor interface 7. Further, a keyboard 13 and a laser excitation power source 14 for a laser oscillator 15 as a reference light beam projector are connected to the external device interface 8. An operator may input various parameter values including values of the exposure period through the keyboard 13. A robot controller is connectable to the communication interface 9.

Commercial or industrial products are adoptable for the camera 11 and the camera interface 6, in particular, a camera having light receiving elements of semiconductor device such as a CCD or CMOS sensor. The camera interface 6 has a function of issuing synchronized signals for controlling an exposure in capturing an image to the camera 11 and a function of altering a gain of amplification of signals received from the camera 11.

Signal representing images captured by the camera 11 are subjected to an A/D conversion at the camera interface 6 and temporarily stored in the frame memory 2 as digital image data. The CPU 1 performs processing of the digital image data stored in the frame memory 2 based on the program stored in the ROM 3 using the set data stored in the non-volatile RAM 5 and the RAM 4, and stores the processed image data in the frame memory 2 again. The processed image data stored in the frame memory 2 are transferred to the monitor interface 7 on demand of the CPU 1 and images are displayed based on the processed image data on the monitor 12 to be confirmed by an operator.

For capturing images of an workpiece as an object of operation of a robot by the camera 11 attached to a distal end of the robot, a robot controller is connected to the communication interface 9, as shown in FIG. 1. The visual sensor sends the detected data to the robot controller upon receipt of commands of capturing image and image processing from the robot controller.

In a case of using the visual sensor as a three-dimensional sensor, the laser excitation power source 14 for exciting the laser oscillator 15 is connected to the external device interface 8, as shown in FIG. 1, so that ON/OFF of projection of a laser beam is controlled by an ON/OFF signal from the CPU 1. The laser oscillator 14 is mounted on a distal end of a robot arm and projects a spot beam or slit beams. The projection of the light beam is controlled in accordance with the operation of the robot or based on a robot control program. For example, the robot controller issues a light projection enable signal to the visual sensor only when the light beam from the laser oscillator 15 at the distal end of the robot arm is directed to a predetermined area, to allow the light projection upon receiving a light projection command only when the light projection enable signal is issued. Thus, the light beam is projected only in a direction within the predetermined area to prevent projection of the light beam in a direction of no use or causing danger. The light projection enable signal may be issued to the visual sensor based on the operation program of the robot, to enable the laser oscillator 15 to project the light beam only when the robot takes a predetermined position/posture. Further, the light projection signal may be issued only when the robot is stopped so as to inhibit projection of the light beam while the robot is moving.

The capturing and composition of images by altering the exposure period will be described. In this embodiment, a value of the exposure period is successively reduced by being multiplied by (1/A: A>1) in each time of capturing an image and density of image on each pixel in the captured images are summed to obtain a final image to be outputted based on the sums of the densities of respective pixels.

A relationship between a brightness X of an incident light on a pixel of the light receiving element and a density Y of the pixel in an image captured with the slowest shutter speed (longest exposure period) S0 is expressed by the following equation (1) by normalizing the brightness X and the density Y such that a dynamic range of the density Y is $0 \leq Y \leq 1$.

$$Y=X (0 \leq X \leq 1)$$

$$Y=1 (1<X) \quad (1)$$

A relationship between the brightness X and the density Y of the pixel of an image captured with a shutter speed (exposure period) S1 obtained by multiplying the exposure period S0 by (1/A) is expressed by the following equation (2).

$$Y=X (0 \leq X \leq A)$$

$$Y=1 (A<X) \quad (2)$$

A relationship between the brightness X and the density Y of the pixel of an image captured with a shutter speed (exposure period) Si obtained by multiplying the exposure period S0 by $(1/A^i)$ is expressed by the following equation (3).

$$Y=X (0 \leq X \leq A^i)$$

$$Y=1 (A^i<X) \quad (3)$$

Figure 3:
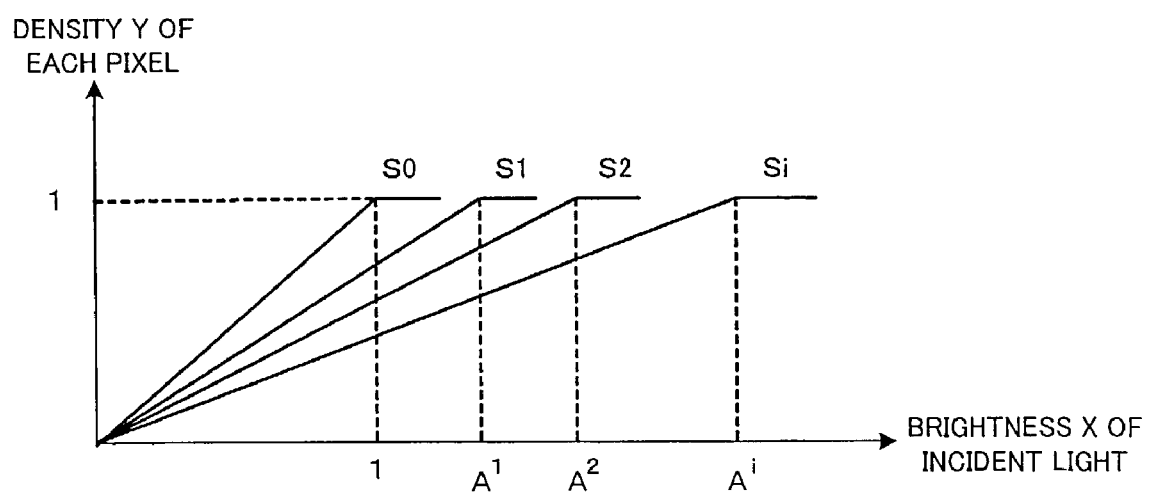
FIG. 3 is a graph showing the relationship between the brightness of the incident light and the density of the pixel in images captured with an exposure period varied stepwise.

A graph showing the above relationships is shown in FIG. 3.

Thus, a sum Z(x) of density of each pixel in N images captured with the exposure period varied stepwise from the longest shutter speed S0 to the shortest shutter speed Sn is expressed by the following set of equations (4);

$$Z(X)=X+(X/A)+(X/A^2)+ \ldots +(X/A^{N-1}) (0 \leq X \leq 1)$$

$$Z(X)=1+(X/A)+(X/A^2)+ \ldots +(X/A^{N-1}) (1<X \leq A)$$

$$Z(X)=1+1+(X/A^2)+ \ldots +(X/A^{N-1}) (A<X \leq A^2)$$

$$Z(X)=1+1+1+ \ldots +(X/A^{N-1}) (A^{N-2}<X \leq A^{N-1}) \quad (4)$$

The equations (4) are represented by a line graph divided into N sections depending on the value of X. A section including a certain value X and a section including a value AX as a product of "A" and "X" are consequentially adjacent to each other. For example, a value 0.5 of X fulfilling the first equation of the above set of equations (4) in the first section and a value 0.5 A of AX fulfils the second equation of the above set of equations (4). Thus, the following equation (5) is obtained from the above set of equations (4).

$$Z(AX)-Z(X)=1-(X/A^{N-1}) (0 \leq X \leq A^{N-2}) \quad (5)$$

Particularly, in the case of X<<AN−1, the following equation (6) is obtained since the above equation (5) is approximated by $Z(AX)-Z(X)=1$.

$$Z(X)=(\log X/\log A)+k \quad (6)$$

(k: an arbitrary constant)

The equation (6) means that Z(X) of the pixel captured with the shutter speed varying from S0 to Si by multiplying (1/A) has characteristics approximated by values obtained by subjecting the brightness X to a logarithm transformation in a range where the brightness of an incident light is smaller than a range obtained by multiplying the dynamic range with the shutter speed S0 by $A^i$.

In an actual application, with a view that it is preferable to avoid making the total time for capturing images so long, number of times of image capturing has to be set to a finite number. Therefore, the approximating degree of the composition result and the ideal logarithm transformation is deteriorated when the number of times of capturing images is small, but practically satisfactory results of the composition have been obtained with the number of times N=3 to 7.

Since there is a case where the result of the equation (6) for subjecting image composition having the approximating logarithm transformation exceeds the upper limit "1" of density of the normalized image, the following equation (7) is adopted for obtaining the final composite image Z'.

$$Z'=B \cdot Z(X)+C \text{ (B and C: arbitrary constants)} \quad (7)$$

The density of each pixel is adjusted according to the equation (7) using the constants B and C. In this embodiment, the constants B and C are determined according to the following equations (8) and (9) using the maximum value Zmax and the minimum value Zmin in values of the composite density Z(X) of all the pixels in the captured image, as characteristic values representing a range of the composite density of all the pixels.

$$1=B \cdot Zmax+C \quad (8)$$

$$0=B \cdot Zmin+C \quad (9)$$

The composite density Z' of each pixel to be outputted is obtained according to the equation (7) using the determined values of the constants B and C.

The constants B and C for adjusting the density are obtained using the maximum value Zmax and the minimum value Zmin of the values of Z(X) for all the pixels. Alternatively, the constants B and C may be determined based solely on the maximum value Zmax, solely on the minimum value Zmin, on a mean value Zmean, on a median, on a mode, and on a combination of the mean value Zmean and a standard deviation (or dispersion) of the summed composite value Z(X).

For determining the constants B and C based solely on the maximum value Zmax of the composite values Z(X), the minimum value Zmin is set to "0" in the equation (9) to determine the constant C to be "0", and the constant B is determined according to the equation (8) using the maximum value Zmax and the determined value "0" of the constant C. Thus, the composite value Z(X) is standardized so that the brightness of incident light from "0" to Zmax is within a range from "0" to "1".

For determining the constants B and C based solely on the minimum value Zmin, the ideal maximum value $A^{N-1}$ is adopted as the minimum value Zmax in the equation (8) to determine the constants B and C according to the equations (8) and (9) using the ideal maximum value $A^{N-1}$ as the maximum value Zmax and the minimum value Zmin.

For determining the constants B and C based on the mean value Zmean (or median or mode) of the composite values Z(X), the constant C is determined as the mean value Zmean of the densities, and the constant B is determined according to the equation (8) by setting the maximum value Zmax to the ideal maximum value $A^{N-1}$. Alternatively, the constant B is determined according to the equation (9) by setting the minimum value Zmin to "0". Further, an absolute value |Zmean−Zmin(=0)| of a difference between the mean value and the minimum value is compared with an absolute value |Zmax(=$A^{N-1}$)−Zmin(=0)| of a difference between the maximum value and the mean value, and if

|Zmean−Zmin(=0)|>|Zmax(=$AN$−1)−Zmean|, the constant B is determined according to the equation (9), and if

|Zmean−Zmin(=0)|≦|Zmax(=$AN$−1)−Zmean|, the constant B is determined according to the equation (8).

Thus, the constant B is determined using one of the Zmin and Zmax which has a larger difference with respect to the mean value Zmean, to eliminate the saturation of the final image. The median or the mode may be used in place of the mean value Zmean. The median is obtained by (Zmax−Zmin)/2, and the mode is determined as a median in an range where frequency of the composite value Z(X) is the most in a plurality of ranges obtained by dividing a variation range of the composite value Z(X).

For determining the constants B and C based on a combination of the mean value Zmean and the standard deviation of the composite value Z(x), the mean value Zmean and the standard deviation σ (or dispersion) of the composite value Z(X) are obtained on an assumption that the frequency of the composite value Z(X) has the normal distribution, to determine the constants B and C such that the composite value Z(x) in a certain range is within a range from "0" to "1".

In this case, the constants B and C are determined according to the equations (8) and (9) using the conditions: Zmax=Zmean+2σ, Zmin=Zmean−2σ. Thus, the composite value Z(X) is standardized such that the brightness of incident light in a range ±σ around the mean value Zmean is within a range from "0" to "1". Zmax may be Zmean+σ, Zmean+3σ, and Zmin may be Zmean−σ and Zeamn−3σ.

Figure 4:
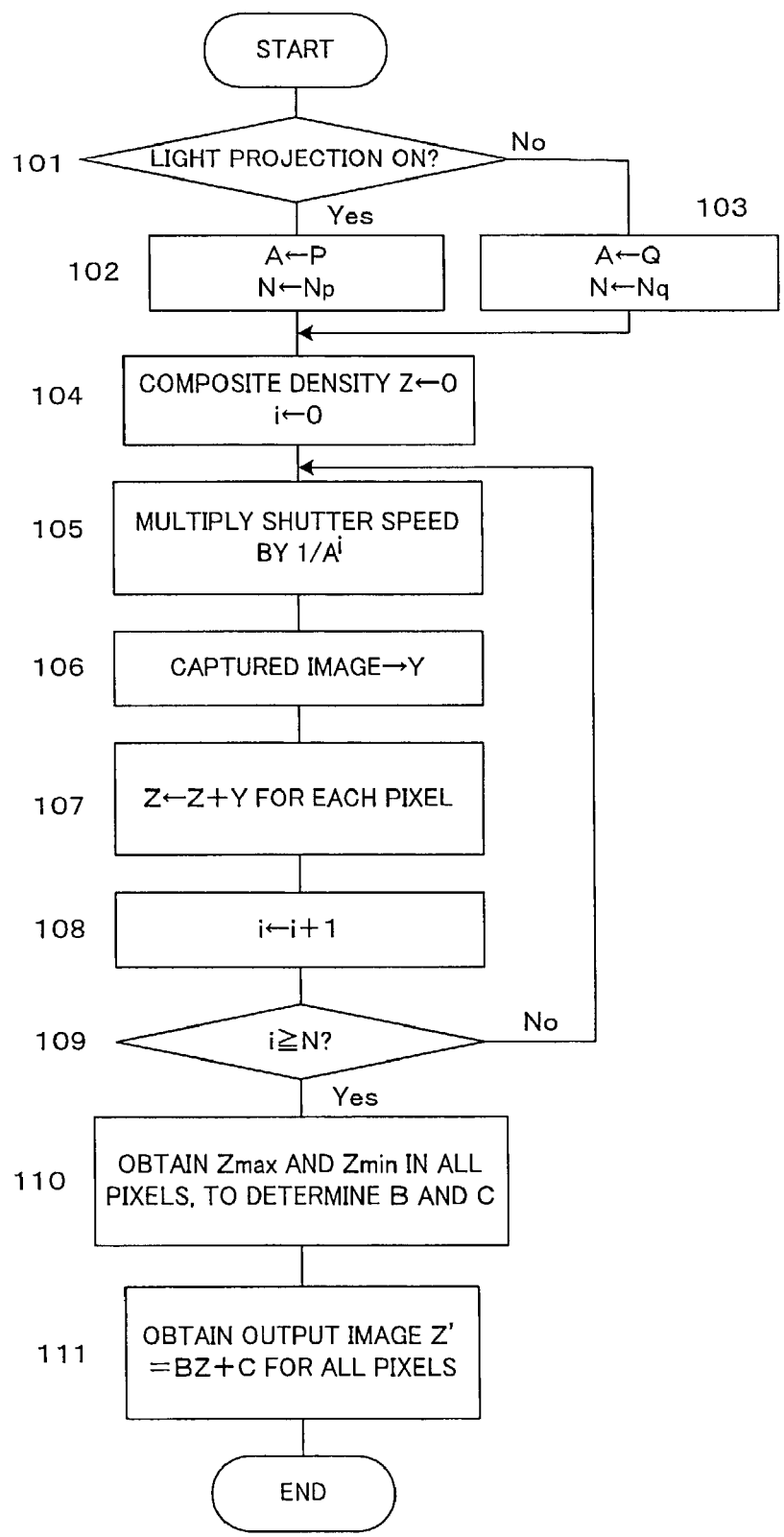
FIG. 4 is a flowchart of a first example of image composition processing according to the present invention.

FIG. 4 shows processing for obtaining the composite image using the visual sensor having the two-dimensional image capturing device such as the camera 11 and the light projecting device for projecting the laser beam (spot beam or slit beam) according to the embodiment. In this case, it is necessary to perform an density transformation for adjusting the density of the whole captured image when the laser beam is turned off, and it is necessary to perform an density transformation for adjusting the density of a part of the captured image on which the laser beam impinged. Characteristics of the above density transformation are different in both cases. Different values are set to the parameter A for altering magnification of the exposure period in capturing an image in accordance with the case where the laser beam is ON and the case where the laser beam is OFF. Thus a value P is set to the parameter A in capturing an image while the laser beam is on and a vale Q is set to the parameter A in capturing an image while the laser beam is off. Further, a value Np is set to the number N of times of image capturing while the laser beam is on and a vale Np is set to the number N while the laser beam is off. The value Np and the value Np may be the same.

First, it is determined whether or not a light projection command is issued to the laser excitation power source 14 (Step 101). If the light projection command is issued, the value P for ON state of the laser beam is set to the parameter A, and the value Np for ON state of the laser beam is set to the number N (Step 102). If the light projection command is not issued, the value Q for OFF state of the laser beam is set to the parameter A, and the value Nq for OFF state of the laser beam is set to the number N (Step 103).

A register for storing a composite image Z of each pixel is set to "0" and an index i is set to "0" (Step 104).

Then, a value of the shutter speed is multiplied by (1/$A^i$) (Step 105) and an image of the object is captured by the camera 11 with the shutter speed and the captured image is stored in the frame memory (Step 106). A density Y of each pixel is added to the register for storing the composite image Z (Step 107). The index i is incrementally increased by "1" (Step 108) and it is determined whether or not the index i is equal or greater than the set value of the number N of times of image capturing (Step 109). The processing from Steps 105 to Step 109 is repeatedly executed until the index i reaches the set value of the number N. In this repetition of processing, since the shutter speed is changed to a value multiplied by (1/$A^i$) at Step 105, each image is captured with the shutter speed obtained by multiplying the shutter speed in the image capturing immediately before each image capturing by (1/$A^i$).

Thus, when the image capturing of the set number N are completed, the maximum value Zmax and the minimum value Zmin in all the composite image are obtained, and values of the constants B and C are obtained by the arithmetic operation according to the equations (8) and (9) (Step 110).

The composite image Z' of each pixel for outputting is obtained by the arithmetic operation according to the equation (7) using the composite image value Z of each pixel using the obtained constants B and C (Step 111), to terminate the processing of obtaining the composite image.

Figure 5:
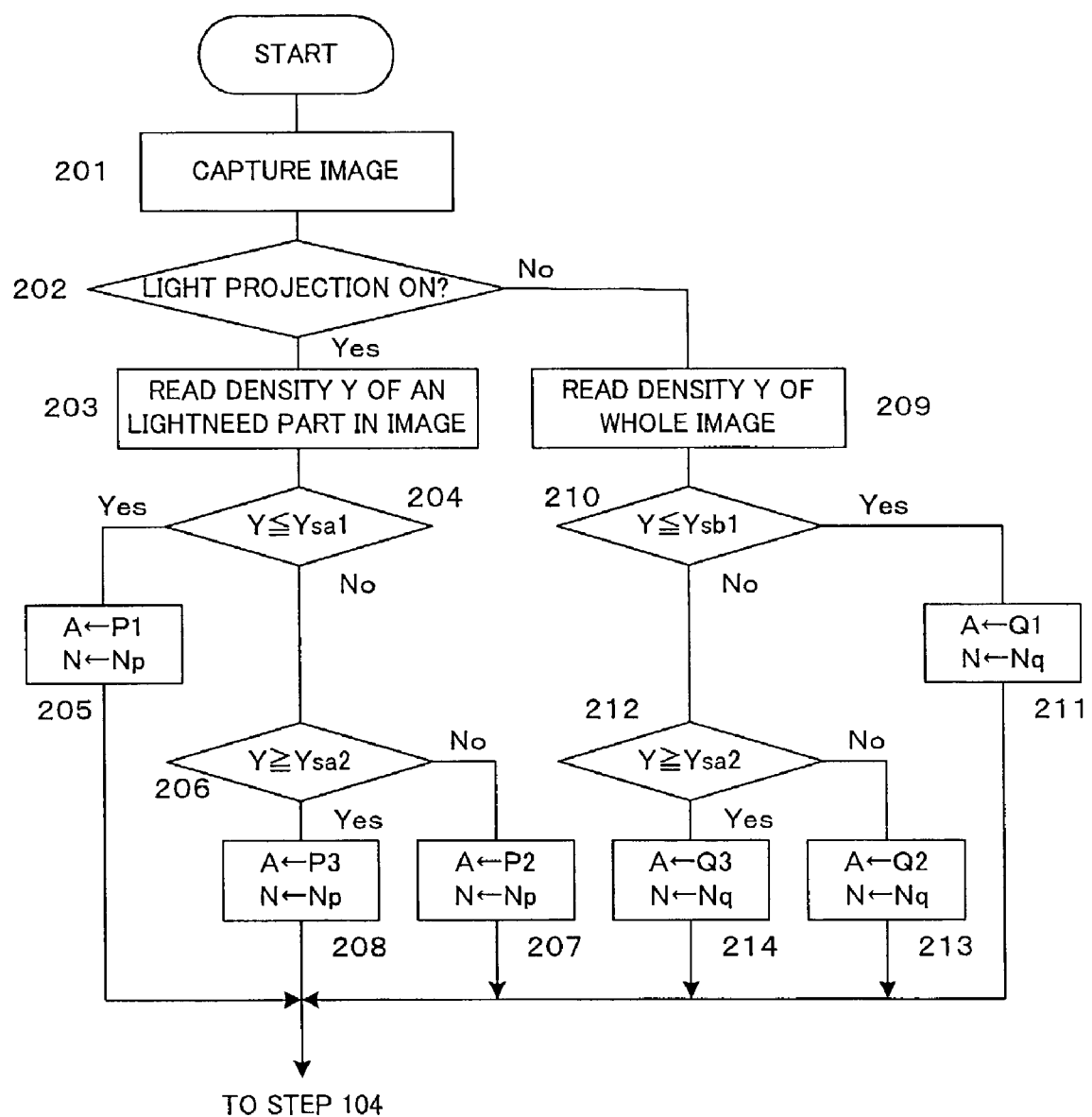
FIG. 5 is part of a flowchart of a second example of image composition processing according to the present invention.

FIG. 5 shows the processing of obtaining the composite image according to a second embodiment. In this second embodiment, the parameter A for altering magnification of the exposure period is changed in accordance with brightness of an image initially captured (a reference image), to obtain the optimum composite image. The parameter A for the case where the projection of the laser beam is on and for the case where the projection of the laser beam is off is classified into three ranks in accordance with brightness of the reference image. In particular, parameter values P1, P2 and P3 in projecting the laser beam and parameter values Q1, Q2 and Q3 in not projecting the laser beam are set in advance. The lumber N of times of image capturing may be changed in accordance with the ranks of images. In this embodiment, however, the value Np in projecting the laser beam and the value Np in not projecting the laser beam are set.

First, an image of an object is captured under an predetermined initial condition (Step 201). It is determined whether or not the projection of laser beam is ON or not (Step 202). If the light projection is ON, the density of a part of the captured image of the object receiving the light beam is read (Step 203) and it is determined whether or not the density is equal or lower than a first reference value Ysa1 (Step 204). If the density is equal or lower than the first reference value Ysa1, a first parameter value P1 for the ON state of the light projection is set to the parameter A for altering magnification of the exposure period, and the predetermined value Np for the ON state of the light projection is set to the number N of times of capturing images (Step 205). Then, the same processing as that of Steps 104 and the subsequent Steps in FIG. 4 is executed.

If it is determined that the density Y is greater than the first reference value Ysa1 in Step 204, it is further determined whether or not the density Y is equal or greater than a second reference value Ysa2 which is greater than the first reference value Ysa1 (Step 206). If it is determined that the density Y is smaller than the second reference value Ysa2 and thus positioned between the first reference value Ysa1 and the second reference value Ysa2, a second predetermined value P2 is set to the parameter A for altering magnification of the exposure period, and the predetermined value Np for the ON state of light projection is set to the number N of times of image capturing (Step 207). If it is determined that the density Y is equal or greater than the second reference value Ysa2, a third parameter value P3 is set to the parameter A and the predetermined value Np is set to the number N of times of image capturing (Step 208).

In the case where the light projection is OFF, the density Y of whole region of the captured image is read (Step 209) and compared with the first and second reference values Ysb1 and Ysb2 (Step 210, Step 212). If the density Y is not greater than the first reference value Ysb1, a first predetermined value Q1 is set to the parameter A (Step 211). If the density Y is between the first reference value Ysb1 and the second reference value Ysb2, the second predetermined value Q2 is set to the parameter A (Step 213). If the density Y is equal or greater than the second reference value Ysb2, the third predetermined value Q3 is set to the parameter A (Step 214). The predetermined value Np for the OFF-state of the light projection is set to the number N of times of image capturing.

After determining the parameter A for altering magnification of the exposure period, the same processing as that of Steps 104 and the subsequent Steps in FIG. 4 is performed, to obtain the final image Z' for output.

In the foregoing embodiments, the constants B and C in the equation (7) for obtaining the ultimate composite image Z' are obtained based on the maximum value Zmax and the minimum value Zmin of densities of all pixels. As described, the constants B and C may be determined based solely on the maximum value Zmax, solely on the minimum value Zmin, the mean value Zmean, a combination of the mean value Zmean and the standard deviation, for obtaining the final output image Z' using the determined constants B and C. In this case, the processing of Step 110 is modified to the processing as described.

Further, the exposure in capturing each image is altered by changing the shutter speed, i.e. the exposure period in the foregoing embodiments. Alternative to changing the exposure period, a gain of brightness of the image may be changed by changing a gain of amplification of a signal from the camera 11 or a gain of amplification in the camera 11 connected to the camera interface. Since changing the gain of brightness is substantially equal to changing the exposure period, substantially the same effect is obtained by changing the exposure period and by changing the gain of brightness. In the case of changing the gain, a gain of amplification of a signal from the camera may be successively multiplied by $(1/A^i)$ instead of the processing of multiplying the shutter speed by $(1/A^i)$ in Step 105. The predetermined values P, Q, P1–P3 and Q1–Q3 are modified to be appropriate to the amplification of gain.

According to the present invention, a dynamic range of a visual sensor is improved in accordance with various conditions of image capturing such as variation of lightning and posture of an object, so that a visual sensor perform s a stable detection not affected by variation of ambience and conditions. Further, a load on a processor for performing arithmetic operations for obtaining a composite image is reduced. Furthermore, the undesirable non-continuousness of density of adjacent pixels of images captured in different conditions, which has been caused in the conventional art, is not produced according to the present invention.

What is claimed is:

1. A visual sensor comprising:
    image capturing means for capturing two-dimensional images of an object with controllable exposure periods;
    reference light projecting means for projecting reference light;
    reference light control means for controlling ON/OFF of the light projection by said reference light projecting means;
    storage means storing magnification parameters for altering the exposure period in accordance with the ON/OFF state of the light projection
    exposure period control means for altering the exposure period by successively multiplying one of the magnification parameters stored in said storage means in accordance with the ON/OFF state of the light projection;
    image acquiring means for acquiring a plurality of two-dimensional images by said image capturing means with exposure periods altered by said exposure period control means in the ON/OFF state of reference light projection controlled by said reference light control means; and
    image processing means for producing a composite image having a characteristic of approximately a logarithm transformation based on a sum of densities of each pixel in the plurality of two-dimensional images acquired by said image acquiring means.

2. A visual sensor according to claim 1, wherein said image processing means obtains a characteristic value representing at least a part of a range of the density of the captured two-dimensional images, and normalizes density of the composite image based on the range of density represented by the characteristic value.

3. A visual sensor according to claim 2, wherein said characteristic value is one of a maximum value, a minimum value, a mean value, a standard deviation, a dispersion, a median and a mode of brightness of at least a part of the two-dimensional images, or any combination of the maximum value, the minimum value, the mean value, the standard deviation, the dispersion, the median and the mode.

4. A visual sensor according to claim 1, wherein said reference light projecting means projects spot light or slit light.

5. A visual sensor according to claim 1, wherein said image capturing means comprises a camera having light receiving elements in the form of semiconductor device.

6. A visual sensor according to claim 1, wherein said visual sensor is connected to a robot and a reference light control means controls ON/OFF of the light projection by said reference light projecting means in accordance with an operation of the robot or an operation program of the robot.

7. A visual sensor comprising:
image capturing means for capturing a two-dimensional images of an object with a controllable exposure period;
reference light projecting means for projecting reference light;
reference light control means for controlling ON/OFF of the light projection by said reference light projecting means;
storage means storing magnification parameters for altering the exposure period in accordance with the ON/OFF state of the light projection;
exposure period control means for altering the exposure period by successively multiplying one of the magnification parameters stored in said storage means in accordance with a density of a part of the two-dimensional image corresponding to a lightened part of the object when the light projection is ON, and in accordance with a density of a part or a whole area of the two-dimensional image when the light projection is OFF;
image acquiring means for acquiring a plurality of two-dimensional images by said image capturing mean with the exposure periods altered by said exposure period control means in the ON/OFF state of reference light projection controlled by said reference light control means; and
image processing means for producing a composite image having a characteristic of approximating a logarithm transformation based on a sum of densities of each pixel in the plurality of two-dimensional images acquired by said image acquiring means.

8. A visual sensor according to claim 7, wherein said image processing means obtains a characteristic value representing at least a part of a range of the density of the captured two-dimensional images, and normalizes density of the composite image based on the range of density represented by the characteristic value.

9. A visual sensor according to claim 8, wherein said characteristic value is one of a maximum value, a minimum value, a mean value, a standard deviation, a dispersion, a median and a mode of brightness of at least a part of the two-dimensional images, or any combination of the maximum value, the minimum value, the mean value, the standard deviation, the dispersion, the median and the mode.

10. A visual sensor according to claim 7, wherein said reference light projecting means projects spot light or slit light.

11. A visual sensor according to claim 9, wherein said image capturing means comprises a camera having light receiving elements in the form of semiconductor device.

12. A visual sensor according to claim 9, wherein said visual sensor is connected to a robot and said reference light control means controls ON/OFF of the light projection by said reference light projecting means in accordance with an operation of the robot or an operation program of the robot.

13. A visual sensor comprising:
image capturing means for capturing a two-dimensional image of an object with a controllable gain of brightness;
reference light projecting means for projecting reference light;
reference light control means for controlling ON/OFF of the light projection by said reference light projecting means;
storage means storing magnification parameters for altering the gain of brightness in accordance with the ON/OFF state of the light projection;
gain control means for altering the gain of brightness by successively multiplying one of the magnification parameters stored in said storage means in accordance with the ON/OFF state of the light projection;
image acquiring means for acquiring a plurality of two-dimensional images by said image capturing means with the gains of brightness altered by said gain control means in the ON/OFF state of reference light projection controlled by said reference light control means; and
image processing means for producing a composite image having a characteristic of approximating a logarithm transformation based on a sum of densities of each pixel in the plurality of two-dimensional images acquired by said image acquiring means.

14. A visual sensor according to claim 13, wherein said image processing means obtains a characteristic value representing at least a part of a range of the density of the captured two-dimensional images, and normalizes density of the composite image based on the range of density represented by the characteristic value.

15. A visual sensor according to claim 14, wherein said characteristic value is one of a maximum value, a minimum value, a mean value, a standard deviation, a dispersion, a median and a mode of brightness of at least a part of the two-dimensional images, or any combination of the maximum value, the minimum value, the mean value, the standard deviation, the dispersion, the median and the mode.

16. A visual sensor according to claim 13, wherein said reference light projecting means projects spot light or slit light.

17. A visual sensor according to claim 13, wherein said image capturing means comprises a camera having light receiving elements in the form of semiconductor device.

18. A visual sensor according to claim 13, wherein said visual sensor is connected to a robot and said reference light control means controls ON/OFF of the light projection by said reference light projecting means in accordance with an operation of the robot or an operation program of the robot.

19. A visual sensor comprising:
image capturing means for capturing a two-dimensional image of an object with a controllable gain of brightness;
reference light projecting means for projecting reference light;
reference light control means for controlling ON/OFF of the light projection by said reference light projection means;
storage means storing magnification parameters for altering the gain of brightness in accordance with the ON/OFF state of the light projection;
gain control means for altering the gain of brightness by successively multiplying one of the magnification parameters stored in said storage means in accordance with a density of a part of the two-dimensional image corresponding to a lightened part of the object when the light projection is ON, and in accordance with a density of a part or a whole area of the two-dimensional image when the light projection is OFF;
image acquiring means for acquiring a plurality of two-dimensional images by said image capturing means with the gains of brightness altered by said gain control means in the ON/OFF state of reference light projection controlled by said reference light control means; and image processing means for producing a composite image having a characteristic of approximating a logarithm transformation based on a sum of densities of each pixel in the plurality of two-dimensional images acquired by said image acquiring means.

20. A visual sensor according to claim 19, wherein said image processing means obtains a characteristic value representing at least a part of a range of the density of the captured two-dimensional images, and normalizes density of the composite image based on the range of density represented by the characteristic value.

21. A visual sensor according to claim 20, wherein said characteristic value is one of a maximum value, a minimum value, a mean value, a standard deviation, a dispersion, a median and a mode of brightness of at least a part of the two-dimensional images, or any combination of the maximum value, the minimum value, the mean value, the standard deviation, the dispersion, the median and the mode.

22. A visual sensor according to claim 19, wherein said reference light projecting means projects spot light or slit light.

23. A visual sensor according to claim 19, wherein said image capturing means comprises a camera having light receiving elements in the form of semiconductor device.

24. A visual sensor according to claim 19, wherein said visual sensor is connected to a robot and said reference light control means controls ON/OFF of the light projection by said reference light projecting means in accordance with an operation of the robot or an operation program of the robot.

* * * * *

UNITED STATES PATENT AND TRADEMARK OFFICE
CERTIFICATE OF CORRECTION

| | |
|---|---|
| PATENT NO. | : 7,190,402 B2 |
| APPLICATION NO. | : 10/140998 |
| DATED | : March 13, 2007 |
| INVENTOR(S) | : Kazunori Ban et al. |

It is certified that error appears in the above-identified patent and that said Letters Patent is hereby corrected as shown below:

In the drawing:

Figure 5 in Box 203, Line 2, change "LIGHTNEED" to --LIGHTENED--.

Column 7, Line 56, change "Zeamn" to --Zmean--.

Column 8, Line 9, change "vale" to --value--.

Column 8, Line 63, change "lumber" to --number--.

Column 10, Line 13, change "perform s" to --performs--.

Column 11, Line 2, after "robot and" change "a" to --said--.

Column 11, Line 8, change "images" to --image--.

Signed and Sealed this

Twenty-sixth Day of June, 2007

JON W. DUDAS
*Director of the United States Patent and Trademark Office*